United States Patent
Rochford et al.

(10) Patent No.: US 10,976,808 B2
(45) Date of Patent: Apr. 13, 2021

(54) BODY POSITION SENSITIVE VIRTUAL REALITY

(71) Applicant: Samsung Electronics Co., Ltd., Suwon-si (KR)

(72) Inventors: Ciaran Rochford, Bellevue, WA (US); Xiaoguang Li, Santa Clara, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 117 days.

(21) Appl. No.: 14/944,060

(22) Filed: Nov. 17, 2015

(65) Prior Publication Data
US 2017/0139474 A1     May 18, 2017

(51) Int. Cl.
| | | |
|---|---|---|
| *G06F 3/01* | (2006.01) |
| *G06T 15/20* | (2011.01) |
| *G02B 27/01* | (2006.01) |
| *G06F 3/00* | (2006.01) |
| *G06F 3/0488* | (2013.01) |
| *G06T 19/00* | (2011.01) |

(52) U.S. Cl.
CPC .......... *G06F 3/012* (2013.01); *G02B 27/0172* (2013.01); *G06F 3/005* (2013.01); *G06F 3/011* (2013.01); *G06F 3/017* (2013.01); *G06F 3/0488* (2013.01); *G06T 15/20* (2013.01); *G06T 19/006* (2013.01); *G02B 2027/0187* (2013.01)

(58) Field of Classification Search
CPC ... G02B 27/017; G02B 27/0172; G06F 3/012; G06F 3/017
See application file for complete search history.

(56) References Cited

U.S. PATENT DOCUMENTS

| | | |
|---|---|---|
| 8,982,471 B1 | 3/2015 | Starner et al. |
| 2011/0270135 A1 | 11/2011 | Dooley et al. |
| 2012/0287234 A1 | 11/2012 | Kim |
| 2014/0055353 A1 | 2/2014 | Takahama |
| 2014/0267400 A1 | 9/2014 | Mabbutt et al. |

(Continued)

FOREIGN PATENT DOCUMENTS

| | | |
|---|---|---|
| WO | 01/02912 A1 | 1/2011 |
| WO | 2014199155 A1 | 12/2014 |

OTHER PUBLICATIONS

Foreign Communication From a Related Counterpart Appiication, PCT Application No. PCT/KR2016/013258, International Search Report dated Feb. 17, 2017, 3 pages.

(Continued)

*Primary Examiner* — Dennis P Joseph

(57) ABSTRACT

An apparatus is provided for displaying a user interface (UI). The apparatus includes a head-mountable display (HMD) and at least one processor configured. The processor is configured to generate content for display by the HMD at a default position in a viewable range, the viewable range including a viewed region that is visible to a user while wearing the HMD. The processor is also configured to, responsive to a change in orientation of the HDM, identify a new default position for the content in the viewable range based on the change in the orientation. The processor is also configured to display the content at the new default position in the viewable range when the new default position is within the viewed region.

16 Claims, 6 Drawing Sheets

(56) References Cited

U.S. PATENT DOCUMENTS

| | | | |
|---|---|---|---|
| 2014/0354515 A1* | 12/2014 | LaValle | G02B 27/017 345/8 |
| 2014/0368537 A1 | 12/2014 | Salter et al. | |
| 2015/0084840 A1* | 3/2015 | Kim | G02B 27/017 345/8 |
| 2015/0177829 A1* | 6/2015 | Sakuta | G06F 3/012 345/156 |
| 2015/0294505 A1* | 10/2015 | Atsmon | G06T 19/006 345/633 |
| 2015/0309311 A1 | 10/2015 | Cho | |
| 2016/0035140 A1* | 2/2016 | Bickerstaff | A63F 13/26 345/633 |
| 2018/0321493 A1* | 11/2018 | Kim | G02B 27/01 |

OTHER PUBLICATIONS

Foreign Communication From a Related Counterpart Application, PCT Application No. PCT/KR2016/013258, Written Opinion dated Feb. 17, 2017, 7 pages.

"Orientation-Disability Options?"; Oculus VR Forums; https://forums.oculus.com/viewtopic.php?f=32&t=1973&sid=0d43251bc321936703e354 . . . ; Apr. 27, 2013; 5 pp.

"Any Lying-Down Demos"; Oculus; https://www.reddit.com/r/oculus/comments/2j0b8d/any_lyingdown_demos; Oct. 12, 2014; 1 p.

Extended European Search Report and European Search Opinion for European Patent Application No. 16866660.0 dated Jul. 3, 2018; 7 pages.

* cited by examiner

BODY POSITION SENSITIVE VIRTUAL REALITY

TECHNICAL FIELD

The present application relates generally to head-mountable displays (HMDs) and, more specifically, to a body position sensitive virtual reality for a HMD.

BACKGROUND

Although HMD technology has long been in development and wearable technology products are increasingly visible, there is a lack of specialized UI framework for HMD for both virtual reality (VR) and augmented reality (AR) applications. Currently HMD technology focuses on situations for VR when the user is sitting in a chair upright. However, the user may sometimes transition to a non-upright position.

SUMMARY

Embodiments of the present disclosure provide a body position sensitive virtual reality for a HMD.

In one embodiment, a method is provided for displaying a user interface (UI) for a head-mountable display (HMD). The method includes generating content for display by the HMD at a default position in a viewable range, the viewable range including a viewed region that is visible to a user while wearing the HMD. The method also includes, responsive to a change in orientation of the HDM, identifying a new default position for the content in the viewable range based on the change in the orientation. The method also includes displaying the content at the new default position in the viewable range when the new default position is within the viewed region.

In another example embodiment, an apparatus is provided for displaying a user interface (UI). The apparatus includes a head-mountable display (HMD) and at least one processor configured. The processor is configured to generate content for display by the HMD at a default position in a viewable range, the viewable range including a viewed region that is visible to a user while wearing the HMD. The processor is also configured to, responsive to a change in orientation of the HDM, identify a new default position for the content in the viewable range based on the change in the orientation. The processor is also configured to display the content at the new default position in the viewable range when the new default position is within the viewed region.

In yet another example embodiment, a non-transitory computer-readable medium comprising program code is provided for generating a display of a user interface (UI) for a head-mountable display (HMD). The program code, when executed by at least one processor, causes an electronic device to generate content for display by the HMD at a default position in a viewable range, the viewable range including a viewed region that is visible to a user while wearing the HMD. The program code, when executed by at least one processor, causes an electronic device to, responsive to a change in orientation of the HDM, identify a new default position for the content in the viewable range based on the change in the orientation). The program code, when executed by at least one processor, causes an electronic device to display the content at the new default position in the viewable range when the new default position is within the viewed region.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer-readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer-readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer-readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
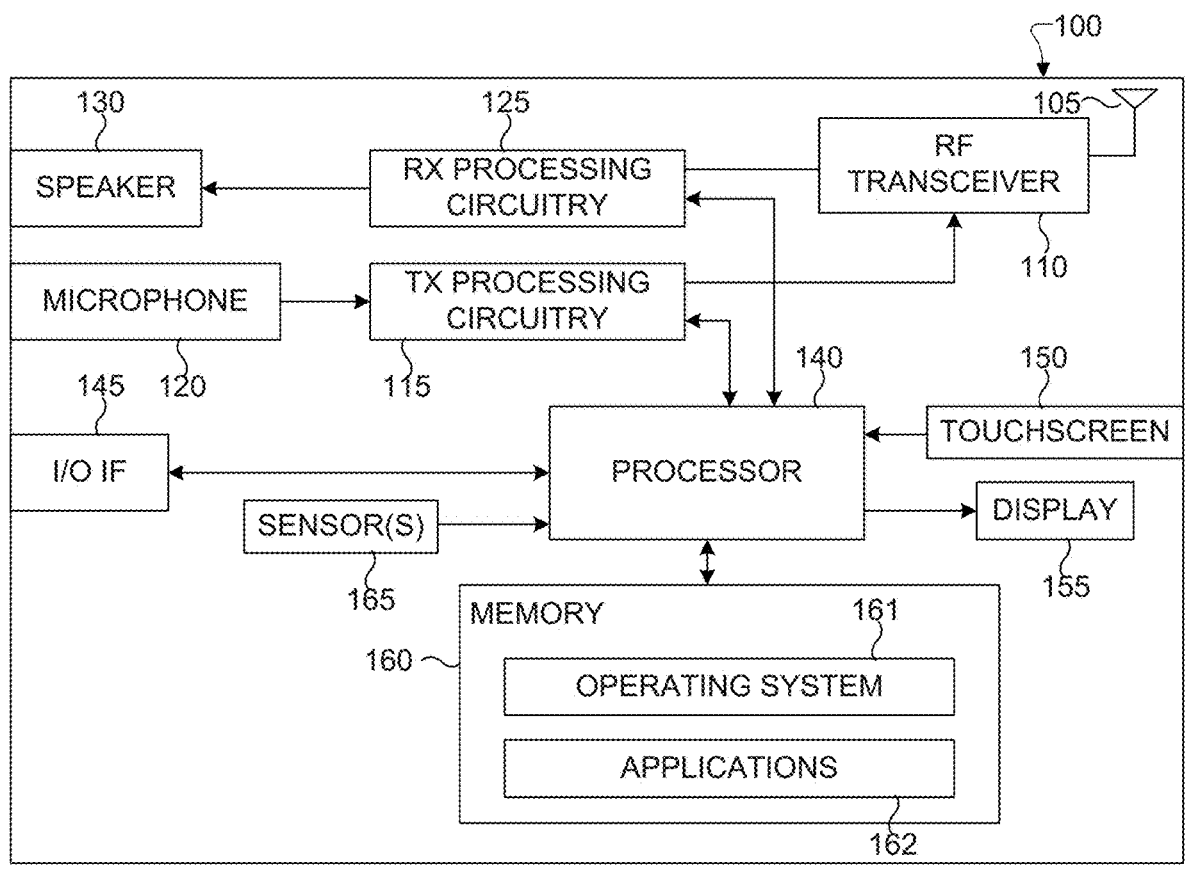
FIG. 1 illustrates an example HMD 100 according to embodiments of the present disclosure and in which embodiments of the present disclosure may be implemented.

For a more complete understanding of the present disclosure and its advantages, reference is now made to the following description taken in conjunction with the accompanying drawings, in which like reference numerals represent like parts:

FIG. 1 illustrates an example HMD 100 according to embodiments of the present disclosure and in which embodiments of the present disclosure may be implemented. The embodiment of the HMD 100 illustrated in FIG. 1 is for illustration only, the HMD 100 comes in a wide variety of configurations, and FIG. 1 does not limit the scope of this disclosure to any particular implementation of a HMD.

In various embodiments, the HMD 100 may take different foiius, and the present disclosure is not limited to any particular form. For example, the HMD 100 may be a mobile communication device, such as, for example, a user equipment, a mobile station, a subscriber station, a wireless terminal, a smart phone, a tablet, etc., that is mountable within a headset for VR and/or AR applications. In other examples, the HMD 100 may include the headset and take the form of a wearable electronic device, such as, for example, glasses, goggles, a helmet, etc., for the VR and/or AR applications.

As shown in FIG. 1, the HMD 100 includes an antenna 105, a radio frequency (RF) transceiver 110, transmit (TX) processing circuitry 115, a microphone 120, and receive (RX) processing circuitry 125. The HMD 100 also includes a speaker 130, a processor 140, an input/output (I/O) interface (IF) 145, a touchscreen 150, a display 155, a memory 160, and one or more sensors 165. The memory 160 includes an operating system (OS) 161 and one or more applications 162.

The RF transceiver 110 receives, from the antenna 105, an incoming RF signal transmitted by an access point (e.g., base station, WiFi router, Bluetooth device) for a network (e.g., a WiFi, Bluetooth, cellular, 5G, LTE, LTE-A, WiMAX, or any other type of wireless network). The RF transceiver 110 down-converts the incoming RF signal to generate an intermediate frequency (IF) or baseband signal. The IF or baseband signal is sent to the RX processing circuitry 125, which generates a processed baseband signal by filtering, decoding, and/or digitizing the baseband or IF signal. The RX processing circuitry 125 transmits the processed baseband signal to the speaker 130 (such as for voice data) or to the processor 140 for further processing (such as for web browsing data).

The TX processing circuitry 115 receives analog or digital voice data from the microphone 120 or other outgoing baseband data (such as web data, e-mail, or interactive video game data) from the processor 140. The TX processing circuitry 115 encodes, multiplexes, and/or digitizes the outgoing baseband data to generate a processed baseband or IF signal. The RF transceiver 110 receives the outgoing processed baseband or IF signal from the TX processing circuitry 115 and up-converts the baseband or IF signal to an RF signal that is transmitted via the antenna 105.

The processor 140 can include one or more processors or other processing devices and execute the OS 161 stored in the memory 160 in order to control the overall operation of the HMD 100. For example, the processor 140 could control the reception of forward channel signals and the transmission of reverse channel signals by the RF transceiver 110, the RX processing circuitry 125, and the TX processing circuitry 115 in accordance with well-known principles. In some embodiments, the processor 140 includes at least one microprocessor or microcontroller. On another embodiment, the processor 140 could also be implemented as processing circuitry. The processor 140 can carry out the operations or instructions of any process disclosed herein.

The processor 140 is also capable of executing other processes and programs resident in the memory 160. The processor 140 can move data into or out of the memory 160 as required by an executing process. In some embodiments, the processor 140 is configured to execute the applications 162 based on the OS 161 or in response to signals received from eNBs or an operator. The processor 140 is also coupled to the I/O interface 145, which provides the HMD 100 with the ability to connect to other devices, such as laptop computers and handheld computers. The I/O interface 145 is the communication path between these accessories and the processor 140.

The processor 140 is also coupled to the touchscreen 150 and the display 155. The operator of the HMD 100 can use the touchscreen 150 to enter data and/or inputs into the HMD 100. The display 155 may be a liquid crystal display, light-emitting diode (LED) display, optical LED (OLED), active matrix OLED (AMOLED), or other display capable of rendering text and/or graphics, such as from web sites, videos, games, etc.

The memory 160 is coupled to the processor 140. Part of the memory 160 could include a random access memory (RAM), and another part of the memory 160 could include a Flash memory or other read-only memory (ROM).

HMD 100 further includes one or more sensors 165 that can meter a physical quantity or detect an activation state of the HMD 100 and convert metered or detected information into an electrical signal. For example, sensor 165 may include one or more buttons for touch input, e.g., on the headset or the HMD 100, a camera, a gesture sensor, a gyroscope or gyro sensor, an air pressure sensor, a magnetic sensor or magnetometer, an acceleration sensor or accelerometer, a grip sensor, a proximity sensor, a color sensor 165H (e.g., a Red Green Blue (RGB) sensor), a bio-physical sensor, a temperature/humidity sensor, an illumination sensor 165K, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, etc. The sensor(s) 165 can further include a control circuit for controlling at least one of the sensors included therein. As will be discussed in greater detail below, one or more of these sensor(s) 165 may be used to identify an orientation of the HMD 100 or user. Any of these sensor(s) 165 may be located within the HMD 100, within a headset configured to hold the HMD 100, or in both the headset and HMD 100, for example, in embodiments where the HMD 100 includes a headset.

The touchscreen 150 can include a touch panel, a (digital) pen sensor, a key, or an ultrasonic input device. The touchscreen 150 can recognize, for example, a touch input in at least one scheme among a capacitive scheme, a pressure sensitive scheme, an infrared scheme, or an ultrasonic scheme. The touchscreen 150 can also include a control circuit. In the capacitive scheme, the touchscreen 150 can recognize touch or proximity.

As described in more detail below, the HMD 100 may include circuitry for and applications for adjusting content, UI, and/or field of view for a HMD. Although FIG. 1 illustrates one example of HMD 100, various changes may be made to FIG. 1. For example, various components in FIG. 1 could be combined, further subdivided, or omitted and additional components could be added according to particular needs. As a particular example, the processor 140 could be divided into multiple processors, such as one or more central processing units (CPUs) and one or more graphics processing units (GPUs). Also, while FIG. 1 illustrates the HMD 100 configured as a mobile telephone, tablet, or smartphone, the HMD 100 could be configured to operate as other types of mobile or stationary devices.

Embodiments of the present disclosure provide an orientation framework for content and a field of view on the HMD 100. For a VR experience using the HMD 100, the user's head motion, i.e., the movement of the HMD 100, and/or body is tracked using sensor(s) 165 in the HMD 100 and used to control the display 155. UI elements of the present disclosure include objects that respond to the user's head motions the same way the content display does. For example, the UI elements may include icons in a menu or other types of UI elements for controlling or manipulating the content displayed by the HMD 100. The present disclosure is especially useful for converting the field of view when the user changes positions.

Figure 2:
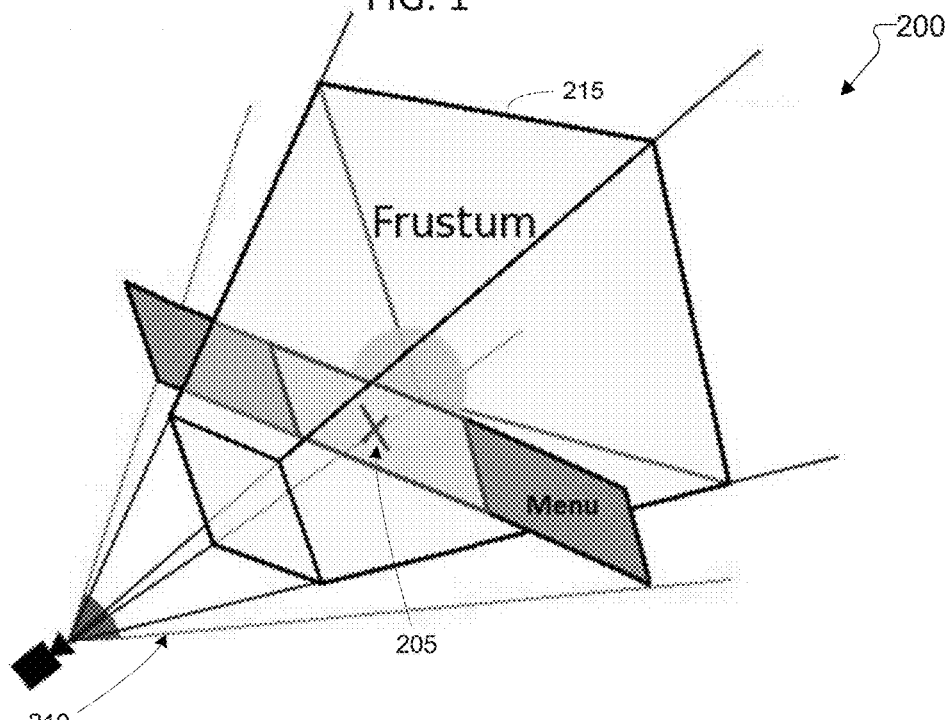
FIG. 2 is a pictorial illustration of content placement in 3D space 200 in accordance with embodiments of the present disclosure.

FIG. 2 is a pictorial illustration of content placement in 3D space 200 in accordance with embodiments of the present disclosure. Various embodiments of the present disclosure provide a 3D display of content 205. As referred to herein, content 205 can include UI elements, media, applications, etc.

As illustrated, the HMD 100 assigns content 205 a position within the 3D space 200 that is viewable by the user of the HMD 100. The position can be indicated in 2D or 3D coordinates, depending on the type of current display rendering mode. For example, if the display is in a 2D mode, the position can be defined by 2D coordinates within a viewable range 210. The HMD 100 places the content 205 within the user's current viewed region 215, i.e., the portion of the total 3D space 200 that is currently viewable by the user as a result of the HMD's 100 current detected orientation and facing direction. In a 3D environment, the viewed region 215 is referred to as a 3D view frustum. In a 2D environment, the viewed region is referred to as a field of view. Content 205 may be 3D objects or 2D objects.

Various embodiments of the present disclosure provide content display within a viewable range 210 that is wider than the user's current 3D view frustum 210. The viewable range 210 (e.g., on the x-z plane assuming a Cartesian coordinate system with the x direction generally denoting left/right or yaw, the y direction generally denoting forward/backwards, and the z direction generally denoting up/down or pitch), within which the content 205 is to be placed, can be different degrees in the x, y, or z direction. In some examples, (e.g., when more content 205 exist than can fit), the HMD 100 displays, either actually or virtually (i.e., not actually displayed on the display 155 but actually displayed when the HMD 100 is moved to a location where the element is virtually displayed), some content 205 outside the current viewed region 215. Note, while certain examples are given in a Cartesian coordinate system, any suitable coordinate system may be used with any tuple serving as the default coordinate directions.

As discussed above, the HMD 100 detects the user's head motions, i.e., the movement of the HMD 100, using the sensor(s) 165 on the HMD 100 and/or headset, such as, for example, a gyroscope, an accelerometer, etc. The HMD 100 displays the content 205 as well as other elements of the display (e.g., content) to respond to the head motions to simulate looking at and interacting with the real-world view and objects.

The present disclosure describes a framework for a body orientation and/or position sensitive UI integrated into an HMD 100. In various embodiments, display of the HMD 100 may be stereoscopic 3D so that the displayed content is assigned 3D coordinates. In binocular HMDs, the displayed image is processed as two images, e.g., left and right display images, each to occupy half of the display screen, and distorted to complement the effects of the lenses (e.g., in the headset) that are placed between the display and the user's eyes for near-eye viewing. The HMD 100 processes the UI disclosed herein as a part of the display image.

The present disclosure also provides user inputs into the UI. For example, the HMD 100 may process different user input modes including, for example, user inputs to select a content 205, move the focus, trigger an action, etc., may be determined based on detecting the press of a button, a predetermined motion pattern of the HMD (e.g., a shake or nodding motion), detecting eye focus for a period of time on a particular area of the screen using facial images captured by a camera, etc.

In one embodiment, the HMD 100 sets viewable range 210 automatically or dynamically for the UI in the "horizontal" and "vertical" directions. In some embodiments, this viewable range 215 may be configured by the user. The viewable range 210 may be wider than the viewed region 215 of the HMD 100, but could also be narrower or wider depending on purpose. The display of the UI is present inside the viewable range 210 so that the user does not have to turn his head too much (e.g., to the left or the right) for a UI interaction.

The content 205 is a position within the viewable range 210 and displayed at the assigned coordinates when the position is within the viewed region 215. The exact position of the content 205 also takes into account factors, such as the coordinates of the elements of the current content 205.

In the present disclosure, the HMD 100 also includes a background within the display. The background exists, as perceived by a user, behind the content 205. In some embodiments, the HMD 100 may adjust the display of the background to make it easier to perceive the content 205; for example, the background might be blurred (as if a blurring layer is placed between the content 205 and the background) or dimmed as the content 205 are displayed.

The arrangement of the content 205 can be changed based on implementation. For example, the content 205 may be displayed as a left-aligned, centered, or right-aligned horizontal list or in a special arrangement fitting for the task at hand.

If there are more content 205 to be displayed than the viewable range 210 allows, the HMD 100 can incorporate additional selections to allow the additional content 205 to be displayed or allow an array of the content 205 to wrap to multiple rows or both, depending on the desired implementation.

Sensor(s) 165 on the HMD 100 detect the changes in the position and orientation of the HMD 100 and/or body of the user as the user moves his or her head, turns, or moves around. The HMD 100 processes the sensed and detected changes to adjust the display of the HMD 100 to simulate looking at the real world. In one example, the content 205 may be stay in the same position within the viewable range 210 while the background moves based on the detected changes.

Embodiments of the present disclosure provide conversion of mobile device applications for HMD applications. For example, embodiments of the present disclosure may be incorporated into a mobile communication device as a framework for a UI mode switch to a HMD UI mode. In this example, embodiments of the present disclosure provide a program that can be stored on the mobile communication device to convert a UI for an application designed for use with handheld mobile devices and recompose the UI for display and interaction on HMD 100. The HMD version of an application display may simply be a recomposed version of the view as implemented for a handheld mobile device created by the HMD 100 or may be a separate view implemented specifically for a HMD 100 by the application developer, based on the framework provided by the HMD 100.

Figure 3A:
FIGS. 3A-3C illustrate examples of a display of an HMD with changes in orientation in accordance with embodiments of the present disclosure.
Figure 3B:
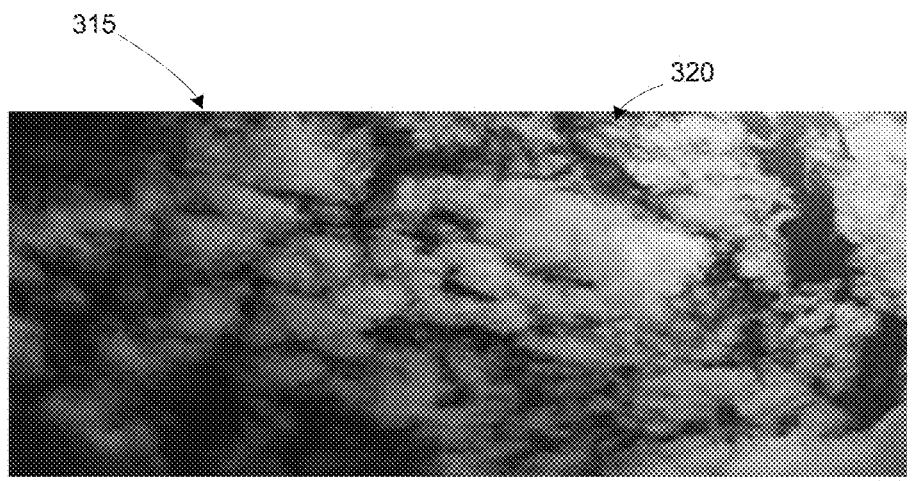
Figure 3C:

FIGS. 3A-3C illustrate examples of a display of an HMD with changes in orientation in accordance with embodiments of the present disclosure. In this illustrative example, a viewed region 305 is displayed by the HMD 100, with the viewed region 315 viewable by the user while wearing the HMD being less than the total view of the viewable range. In FIG. 3A, a portion 310 of a viewable range is depicted. The viewable range could be greater than the portion 310, such as 360 degrees. The background 320 is perceived by a user behind the content 305 and can exist in all areas of the 360 degrees viewable range.

As illustrated in FIG. 3A, the HMD displays the content 305 in a portion of a 360° view of the viewable range. Viewed region 515 represents the user's current view region. Since the viewable range can be spherical, the user can turn his head and/or body to see different parts of the viewable range using the HMD 100.

As illustrated in FIG. 3B, when a user rotates the angle of the HMD 100, the HMD 100 the content 305 may be moved outside of the viewed region 315 and only the background may remain in the viewed region 315. As used herein, the viewed region 315 can refer to the portion of a viewable range displayed or a portion that is actually visible to a user.

As illustrated in FIG. 3C, once the HMD 100 detects a change in orientation from the display in FIG. 3B, the HMD 100 can reposition the content 305 based on the viewed region 315 and/or the viewable range. In this example embodiment, the background 320 does not change from FIG. 3B to FIG. 3C.

In one embodiment, HMD 100 is configured to automatically reconfigure the virtual environment based on the HMD 100 orientation and/or a user body/head orientation to provide the user with an optimal experience taking into consideration the user orientation, position, and individual preferences. In one example, the orientation could be changed while the user is lying down. In this example, the VR could be adjusted to be overhead and the viewing range limited to 180 degrees. In another example, the orientation could be changed while the user is sitting in a non-swivel chair. In this example, the user could limit or the HMD 100 could adjust automatically to have a viewing range limited to 220 degrees. In yet another example, the orientation could be changed while the user is lying face down (similar to position for a massage) and the content could be adjusted to be below user and the viewing range could be limited to 120 degrees.

In one example embodiment where the user is in bed, the HMD 100 changes a content position to a specific virtual region which would be based on the user's head angle and orientation. This position would allow for easy movie watching, the VR desktop to keep content within user view field, could have a dimming mode to help reduce user eye strain and help transition to sleep, and should allow for people who rest on their sides proper viewing.

In one example embodiment where the user is in the dentist or doctor's office, the HMD 100 changes a content position to distract/entertain the user while a medical or detail procedure is being performed. In one example embodiment where the user is in the gym, the HMD 100 changes a content position while the user is using equipment that requires them to lie on their back. In one example embodiment when the user is having a massage/treatment that requires the user to face head down, changes a content position to restrict the users head motion ability so the content must be concentrated in a smaller virtual space.

In one example embodiment while the user is in a reclining chair or propped up in a bed at an angle (or an airline chair), the HMD 100 changes a content position so the user will not have to look directly behind them for content. In an airplane, the HMD 100 changes content during takeoff/landing. The headset could adjust for your head position relative to a user's perceived orientation.

In one or more embodiments, the HMD 100 recognizes the user head orientation on a continual basis by checking gyroscope/sensors. The HMD 100 could enter a "position aware" mode. The HMD 100 could alter the viewable range that could be use for content in order to optimize the experience. The HMD 100 could then change the viewable range available to applications/launcher to ensure the applications/launcher stayed within the new content boundaries of the viewable range.

The VR world background content could behave as it normally does by moving based on the user's motion. In other words if the user looks up, the user may see the virtual "sky" part of the background. The actual application content could be given a new position to ensure the application content is within the users viewed region.

In one embodiment, the HMD 100 could handle transiting to the orientation sensitive mode mode from a regular mode. Transition effects could be implemented between different modes in order not to cause the user motion sickness. For example, a fade-in effect could be used. Other effects could also be set by the user.

In another embodiment, a user could have an orientation profile. The profile could include user preferences for when to change the position of the content based on a change in the orientation of the HDM 100 and/or body of the user. The user could have several profiles that could be setup by default and then tailored/tuned by the user through calibration. The profile could include a viewable range placement for a given viewing angle, the perceived distance for the content, the brightness of the display (e.g., when lying in bed a user may want the display dimmer), the maximum angle content should be allowed to be placed at on the right, left, up and down, the maximum number of applications to be shown, the max power consumption, and the transitions effects to use for transitions.

Figure 4:
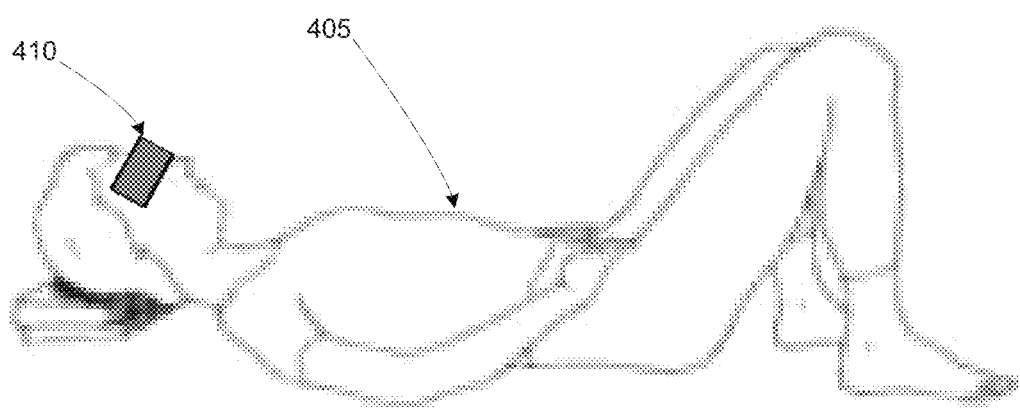
FIG. 4 is a pictorial illustration of a user 405 wearing an HMD 410 in accordance with embodiments of the present disclosure.

FIG. 4 is a pictorial illustration of a user 405 wearing an HMD 410 in accordance with embodiments of the present disclosure. In FIG. 4, the user 405 is in lying down orientation with the HMD 410 in an upward facing direction. In this example embodiment, the HMD 410 may detect the change in orientation and reposition the content in the viewing range. The content could be repositioned into a limited viewing range that is based on the upwards facing direction.

Figure 5:
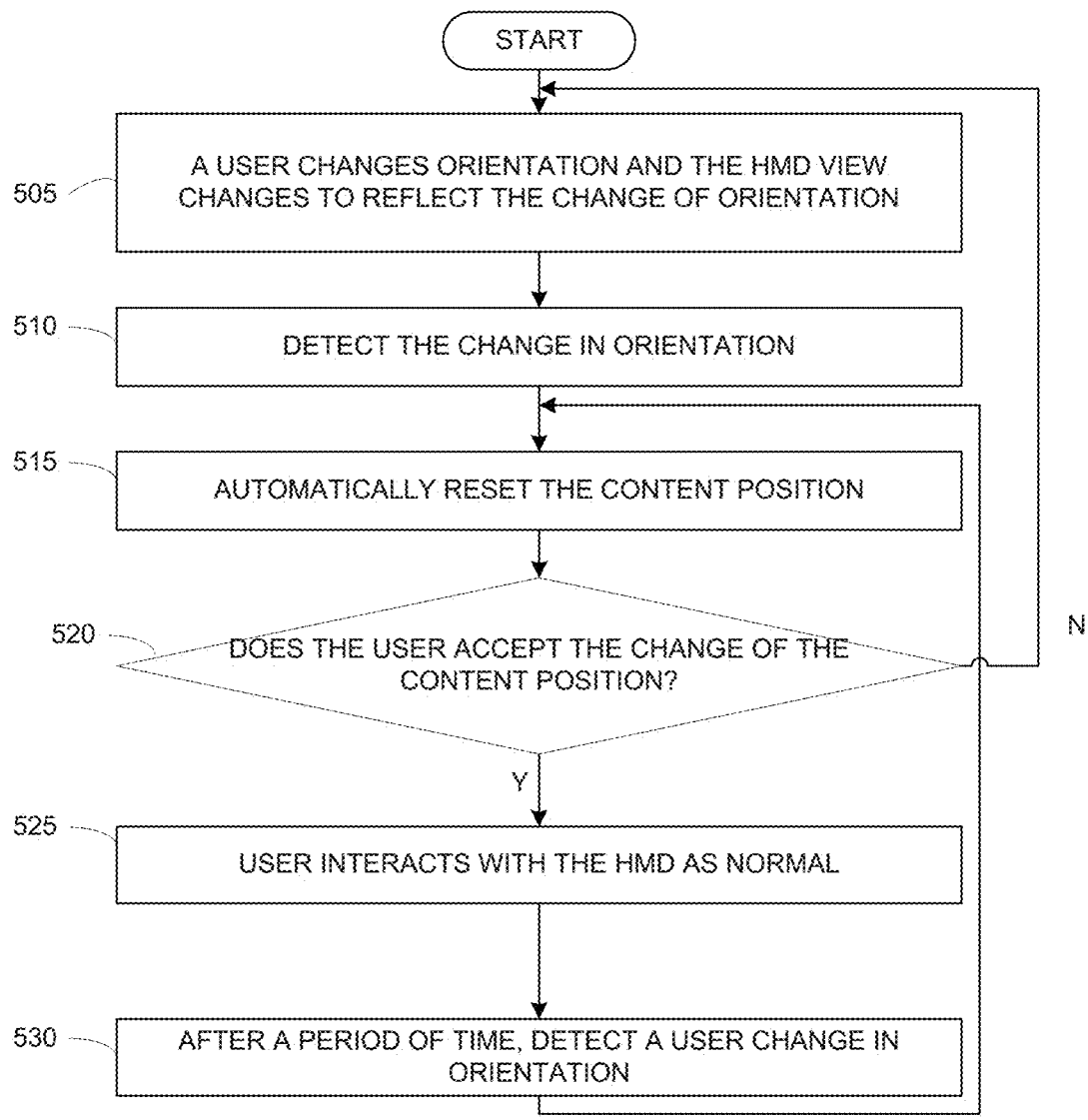
FIG. 5 illustrates a process for adjusting a display of an HMD based on orientation according to embodiments of the present disclosure.

FIG. 5 illustrates a process for adjusting a display of an HMD based on orientation according to embodiments of the present disclosure. For example, the process depicted in FIG. 5 may be performed by the HMD 100 in FIG. 1.

The process begins, at operation 505, with a user changing orientation and the HMD 100 view changing in response to reflect the change of the orientation. When the HMD 100 view changes, the content displayed on HMD 100 could be left off screen. In other examples, the user may be temporarily viewing another area of the viewing range.

At operation 510, the HMD 100 detects the change in orientation. The change could be differentiated from a temporary viewing movement by comparing the time of movement to a threshold, obtaining an indicating of the change from the user, using external cameras to identify a changed body orientation/position, etc.

At operation 515, the HMD 100 automatically resets the content position. In one example, the content is anchored to a default position and this default position is moved to another position in the viewing range. In another example, the default position is not anchored, but starts in a default position, and this default position is moved to another position in the viewing range.

At operation 520, the HMD 100 determines whether the user accepts a change of the content position. The HMD 100 can identify the change in orientation and reposition the content. Once the content is repositioned, the HMD 100 can prompt the user for confirmation of the change. In other examples, the HMD 100 prompts the user before repositioning the content.

If the user does not accept the change, the process starts over. If the user accepts the change, at operation 525, the HMD 100 interacts with the user normally. The user is able to move within the 3D VR viewing range.

At operation 530, after a period of time, the HMD 100 may detect another user change in orientation. The process then moves to operation 515 to readjust the content position.

Although FIG. 5 illustrates an example process for displaying a UI for a HMD, various changes could be made to FIG. 5. For example, while shown as a series of steps, various steps in each figure could overlap, occur in parallel, occur in a different order, or occur multiple times.

Figure 6:
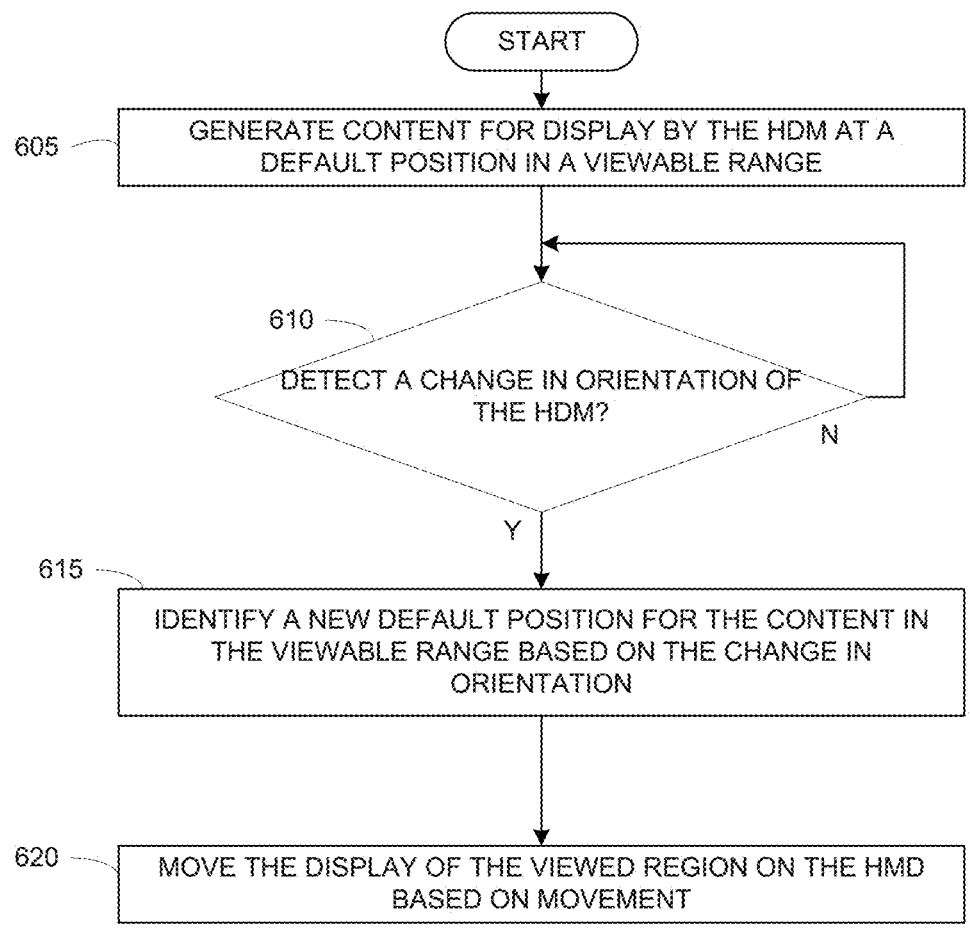
FIG. 6 illustrates a process for adjusting a display of an HMD based on orientation according to embodiments of the present disclosure.

FIG. 6 illustrates a process for adjusting a display of an HMD based on orientation according to embodiments of the present disclosure. For example, the process depicted in FIG. 6 may be performed by a processor of the HMD 100 in FIG. 1.

At operation 605, the processor generating content for display by the HMD at a default position in a viewable range. The viewable range including a viewed region that is visible to a user while wearing the HMD.

At operation 610, the processor, responsive to a change in orientation of the HDM, identifies a new default position for the content in the viewable range based on the change in the orientation. The change could be differentiated from a temporary viewing movement by comparing the time of movement to a threshold, obtaining an indicating of the change from the user, using external cameras to identify a changed body orientation/position, etc.

In one example embodiment, the processor identifies the new default position for the content within the viewable range based on the change in the orientation and the viewed region that is visible to the user while wearing the HMD. In this example, a viewable range limits the new default position (whether 180 degrees, 110 degrees, 90 degrees, 360 degrees, etc.) and a viewed region. The viewed region may naturally sit at a certain angle within the viewable region. For example, the user could be lying down and facing straight upward and that angle could deter nine the new default position for the content.

In another example embodiments, the processor identifies the change in the orientation of the HMD where at least a portion of the content is displayed on the HMD outside of the viewed region of the user while wearing the HMD. In this example, the change in orientation identification does not begin until at least some of the content is positioned off screen and not in the viewed region.

In yet another example embodiments, the processor identifies the change in the orientation of the HMD when receiving a user input indicating the change. In this example, the user can indicate that a change occurs. In another example, the user can set the HMD 100 to a "position aware" mode where the processor only identifies changes in orientation during this mode.

In one example embodiment, the viewed region is at an angle within the viewable range. In this example, the processor identifies the change in the orientation of the HMD based on an average viewing angle of the viewed region over a period of time. The average viewing angle can be compared to a threshold difference of angles. The average can be compared to a prior set viewing angle. For example, when the user is sitting, there is a certain direction the user is facing, and this direction can be the set viewing angle. When that user lies down, the average viewing angle will slowly move to the new direction the user is facing. Once the difference between the average viewing angle and the prior set viewing angle is greater than a threshold difference, a change in orientation can be identified.

In another example embodiment, the processor controls a camera coupled to the HMD to capture a body position or posture of the user. The processor identifies a change in the orientation of the HMD based on the body position or posture of the user. The body position could be a change in neck alignment, based on furniture, or overall body positioning.

In yet another example embodiment, a background exists behind the content in the viewed region. In this example embodiment, the background does not change positions based on the change in orientation. The user is able to view different portions of the background around the viewable range by moving the HMD 100.

At operation 615, the processor displays the content at the new default position in the viewable range when the new default position is within the viewed region. In another example, the default position is not anchored, but starts in a default position, and this default position is moved to another position in the viewing range.

At operation 620, the process moves the display of the viewed region on the HMD 100 based on movement. The HMD 100 can identify regular movement within the virtual reality and move the viewed region based on the movement. In some examples, the content does not move with the viewed region. In other examples, when a change in orientation is identified, the process may move to operation 615.

Although FIG. 6 illustrates an example process for displaying a UI for a HMD, various changes could be made to FIG. 6. For example, while shown as a series of steps, various steps in each figure could overlap, occur in parallel, occur in a different order, or occur multiple times.

Embodiments of the present disclosure provide a framework for HMD UI design and for converting a UI of mobile device application for use on an HMD with stereoscopic 3D display. Embodiments of the present disclosure allow for application designs for 2D mobile device screen to be decomposed into elements, such as action bar items, main content, navigation bar items, etc., and recomposed for a 3D HMD environment.

Embodiments of the present disclosure provide stereoscopic 3D display to emulate depth but may similarly be applied in a 2D display. Embodiments of the present disclosure enable not only depth of displayed content but also interaction with UI elements. For example, the user might "walk through" the UI elements, or different levels of nested arrays might be displayed at different depths.

Embodiments of the present disclosure also mirror the movement of the UI elements to the user's movements so that the UI movements feel natural, instead of being accelerated or otherwise exaggerated or interpolated. As the view of a HMD is immersive, unpleasant effects of unnatural movements of display elements are amplified in a HMD, and natural interaction is provided. The menu display may not be fixed in relation to the user position or the device, but may be fully integrated into and move with the 3D scene.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method for displaying a user interface (UI) for a head-mountable display (HMD), the method comprising:
displaying a first portion of a viewable range of a background image in a display region of the HMD at a first viewing angle, wherein at least a portion of the viewable range of the background image is outside the display region of the HMD, wherein the display region is a three-dimensional view frustum, and wherein the background image is at a first position defined by a first set of coordinates;
generating content for display by the HMD at a first default position within the display region of the HMD and in front of the first portion of the viewable range of the background image, wherein the first default position is located within the display region at a second position defined by a second set of coordinates that is different than the first set of coordinates to cause the content to be perceived in front of the background image; and
responsive to a change in orientation of the HMD from the first viewing angle to a second viewing angle, changing the background image while maintaining a position of the content by:
displaying a second portion of the viewable range of the background image in the display region of the HMD, the second portion comprising at least some of the viewable range of the background image that was previously outside the display region of the HMD,
identifying a second default position for the content for display by the HMD in front of the second portion of the viewable range of the background image based on the second viewing angle, wherein the second default position is located within the display region at a third set of coordinates that differs from the second set of coordinates based on yawing or pitching the content in an x-z plane,
relocating the content from the first default position to the second default position, wherein the relocating is based on the yawing or pitching the content in the x-z plane, and
displaying the content in the three-dimensional view frustum at the second default position as it appeared at the first default position.

2. The method of claim 1, wherein identifying the second default position for the content for display by the HMD in front of the second portion of the viewable range of the background image is based on the change in the orientation of the HMD over a period of time and the display region displayed by the HMD.

3. The method of claim 1, wherein identifying the second default position is initiated when the change in the orientation of the HMD positions at least a portion of the content displayed on the HMD outside of the display region of the HMD.

4. The method of claim 1, further comprising:
identifying the change in the orientation of the HMD when receiving a user input indicating the change.

5. The method of claim 1, further comprising:
capturing a body position or posture of a user through a camera coupled to the HMD; and
identifying the change in the orientation of the HMD over time based on the body position or posture of the user.

6. An apparatus for displaying a user interface (UI), the apparatus comprising:
a head-mountable display (HMD); and
at least one processor configured to, in response to movement of the HMD, vary a background image while maintaining a position of a content by:
displaying a first portion of a viewable range of the background image in a display region of the HMD at a first viewing angle, wherein at least a portion of the viewable range of the background image is outside the display region of the HMD, wherein the display region is a three-dimensional view frustum, and wherein the background image is at a first position defined by a first set of coordinates,
generating the content for display by the HMD at a first default position within the display region of the HMD and in front of the first portion of the viewable range of the background image, wherein the first default position is located within the display region at a second position defined by a second set of coordinates that is different than the first set of coordinates to cause the content to be perceived in front of the background image,
responsive to a change in orientation of the HMD from the first viewing angle to a second viewing angle, identifying a second default position for the content in the viewable range of the background image based on the second viewing angle, wherein the second default position is located within the display region at a third set of coordinates that differs from the second set of coordinates based on yawing or pitching the content in an x-z plane,
relocating the content from first default position to the second default position, wherein the content is relocated by a yaw motion or a pitch motion in the x-z plane, and
displaying the content in the three-dimensional view frustum at the second default position as it appeared at the first default position.

7. The apparatus of claim 6, wherein the processor is further configured to identify the second default position for the content for display by the HMD in front of and within the viewable range of the background image is based on the change in the orientation of the HMD over a period of time and the display region of the background image displayed by the HMD.

8. The apparatus of claim 6, wherein the at least one processor is further configured to:
initiate and identify the second default position when the change in the orientation of the HMD positions at least a portion of the content is displayed on the HMD outside of the display region of the HMD.

9. The apparatus of claim 6, wherein the at least one processor is further configured to:
identify the change in the orientation of the HMD when receiving a user input indicating the change.

10. The apparatus of claim 6, wherein the at least one processor is further configured to:
capture a body position or posture of a user through a camera coupled to the HMD; and
identify the change in the orientation of the HMD based on the body position or posture of the user.

11. The apparatus of claim 6, wherein the viewable range of the background image is a plane within the display region of the HMD that is wider than the display region.

12. The apparatus of claim 6, wherein:
the HMD is a display for a mobile communication device,
the display region displayed by the HMD is smaller than the display for the mobile communication device, and
the at least one processor is configured to convert two-dimensional content displayable by the display for the mobile communication device into three-dimensional content for display on the HMD in the display region.

13. A non-transitory computer-readable medium comprising program code for generating a display of a user interface (UI) for a head-mountable display (HMD) that, when executed by at least one processor, causes an electronic device to:
display a first portion of a viewable range of a background image in a display region of the HMD at a first viewing angle, wherein at least a portion of the viewable range of the background image is outside the display region of the HMD, wherein the display region is a three-dimensional view frustum, and wherein the background image is at a first position defined by a first set of coordinates;
generate content for display by the HMD at a first default position within the display region of the HMD and in front of the first portion of the viewable range of the background image, wherein the first default position is located within the display region at a second position defined by a second set of coordinates that is different than the first set of coordinates to cause the content to be perceived in front of the background image; and
responsive to a change in orientation of the HMD from the first viewing angle to a second viewing angle, changing the background image while maintaining a position of the content by:
identifying a second default position for the content in the viewable range of the background image based on the second viewing angle, wherein the second default position is located within the display region at a third set of coordinates that differs from the second set of coordinates based on yawing or pitching the content in an x-z plane,
relocating the content from the first default position to the second default position based on a yaw motion or a pitch motion in the x-z plane, and
displaying the content in the three-dimensional view frustum at the second default position as it appeared at the first default position.

14. The non-transitory computer-readable medium of claim 13, wherein identifying the second default position for the content for display by the HMD in front of and within the viewable range of the background image is based on the change in an average orientation of the HMD over a period of time and the display region of the background image displayed by the HMD.

15. The non-transitory computer-readable medium of claim 13, further comprising program code that that, when executed by the at least one processor, causes the HMD to:
initiate and identify the second default position when the change in the orientation of the HMD positions at least a portion of the content displayed on the HMD outside of the display region of the HMD.

16. The non-transitory computer-readable medium of claim 13, further comprising program code that that, when executed by the at least one processor, causes the HMD to:
identify the change in the orientation of the HMD when receiving a user input indicating the change.

* * * * *